July 6, 1937.    V. J. TICHOTA ET AL    2,086,056
COUPLER
Filed March 25, 1936    2 Sheets-Sheet 1
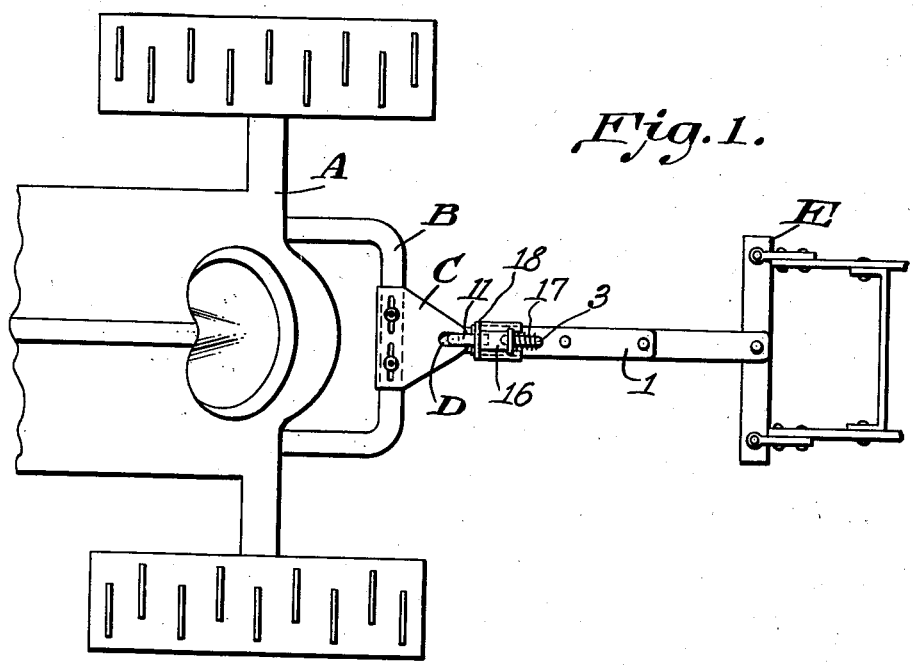
Fig. 1.
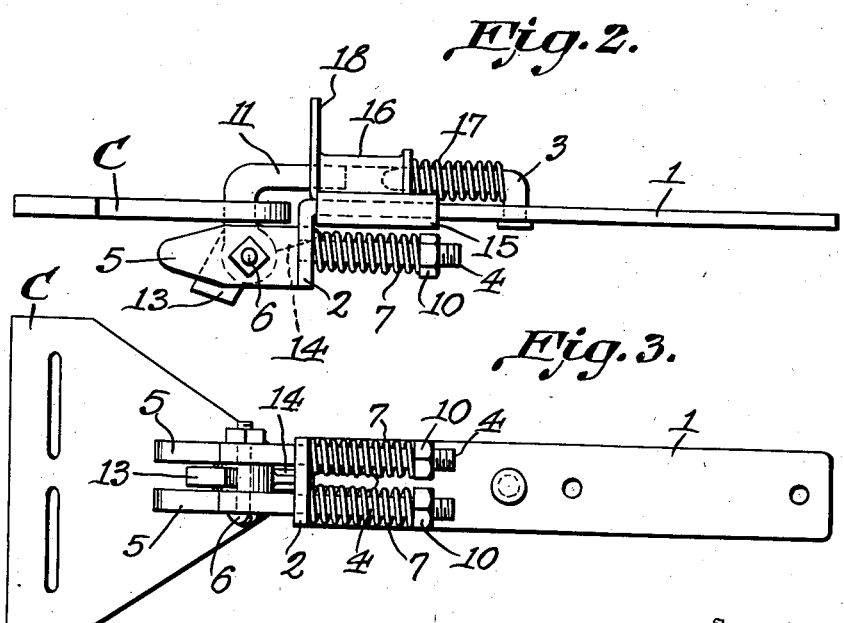
Fig. 2.
Fig. 3.
Inventors
Vencel J. Tichota
Neil H. Mapes
By C. A. Snow & Co.
Attorneys.

July 6, 1937.   V. J. TICHOTA ET AL   2,086,056
COUPLER
Filed March 25, 1936   2 Sheets-Sheet 2

Inventors
Vencel J. Tichota
Neil H. Mapes
By C.A.Snow&Co.
Attorneys.

Patented July 6, 1937

2,086,056

UNITED STATES PATENT OFFICE 2,086,056

COUPLER

Vencel J. Tichota, Dodge, and Neil H. Mapes, Fremont, Nebr.

Application March 25, 1936, Serial No. 70,864

1 Claim. (Cl. 280—33.16)

This invention relates to a coupler designed primarily for connecting a plow or the like to a tractor or other draft means.

It is an object of the invention to provide a coupler which will operate automatically to release the plow or the like from the pulling means should the plow engage a stump, boulder, or other unyielding object in the path thereof.

Another object is to provide a release device which can be actuated by the operator when so desired.

Another object is to provide a device of this character which will automatically couple the tractor or the like to the plow or other structure to be pulled, the coupling operation being effected by moving the parts against each other.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred form of the invention has been shown.

In said drawings

Figure 1 is a plan view of a portion of a tractor and of a plow or the like, the same being joined by the coupler constituting the present invention.

Figure 2 is a side elevation of the coupler.

Figure 3 is a bottom plan view thereof.

Figure 4:
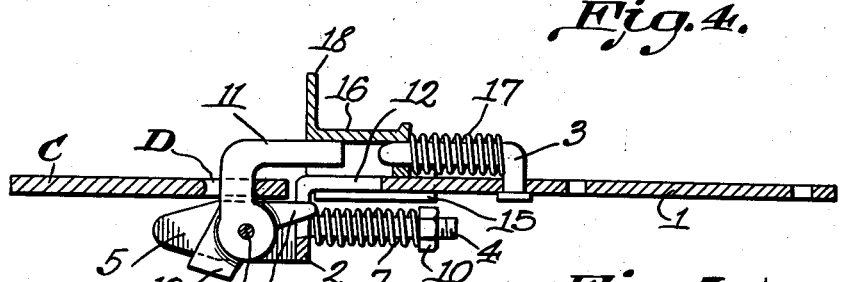
Figure 4 is a longitudinal section through the coupler showing the parts in the positions shown in Figures 2 and 3.

Referring to the figures by characters of reference A designates a tractor having a cross bar B from which is extended a tongue C having an elongated slot D.

A plow or other structure to be pulled is indicated at E and has the present improvements attached thereto. These include an elongated tongue 1 having a downturned forward end 2 forming a guide ear and connected to the tongue and extending thereabove and parallel therewith is a guide pin 3.

Slidable in the ear 2 are parallel stems 4 each provided at its front end with a head 5, the two heads being joined by a transverse pivot bolt 6. Springs 7 are mounted on stems 4 and bear at their forward ends against ear 2 while their back ends thrust against nuts 10 adjustably mounted on the stems 4. Thus the heads 5 are held normally pressed back against ear 2.

Pivotally mounted on the bolt 6 is an angular coupling pin 11 preferably L-shaped and the free end of which is adapted to move into position over the adjacent end of tongue 1 which, as shown at 12, is centrally slotted. The other end of this coupling pin, which is engaged by pin or bolt 6 and supported between heads 5, has a stop ear 13 and a tripping finger 14 extended from it. The tripping finger is disposed substantially parallel with the free end portion of pin 11 while the stop ear is adapted to move against guide ear 2 when the finger 14 is moved into an upwardly inclined position, thereby to limit the swinging movement of the pin 11 and finger 14 upwardly away from tongue 1.

A slide 15 is mounted on tongue 1 between ear 2 and the secured end of guide pin 3. This slide carries a tubular keeper 16 one end of which receives the guide pin 3 and is engaged by one end of a coiled spring 17 mounted on pin 3. This spring serves to hold the keeper normally pressed forward to the end of tongue 1. A push plate 18 is extended upwardly from the forward end of keeper 16 and is provided for the purpose hereinafter described.

Figure 5:
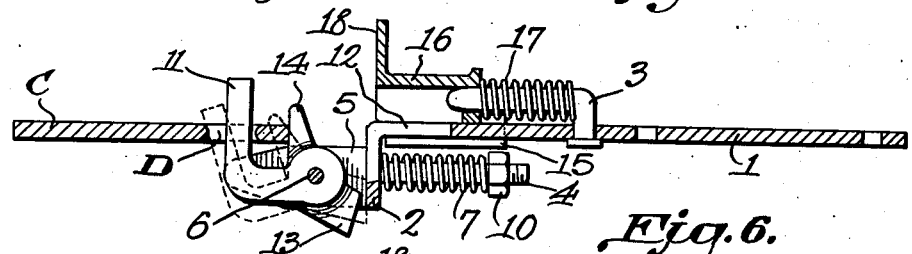
Figure 5 is a view similar to Figure 4 showing the first step in automatically coupling a tractor or the like to a plow.
Figure 6:
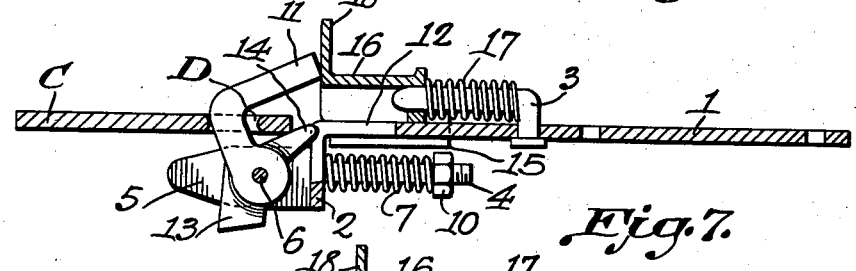
Figure 6 is a view similar to Figure 5 showing the next position of the parts during the automatic coupling operation and before reaching the positions shown in Figure 4.

In practice the keeper 16 is thrust back against spring 17 from the position shown in Figure 2 so as to release pin 11 and allow it to be swung forwardly to the position indicated by broken lines in Figure 5 at which time the stop ear 13 will press against guide ear 2. The tractor and/or plow are then moved toward each other so that tongue C will be brought into position with pin 11 projecting upwardly into slot D and finger 14 projecting across the end of the tongue. By then backing the tractor the end of the tongue will press against finger 14 and move pin 11 first to the position shown by full lines in Figure 5 and then to the position shown in Figure 6. Further backing of the tractor and its tongue C will cause the front end wall of slot D to press against pin 11 and cause the end of the pin to thrust against plate 18 and push keeper 16 back until the end of the pin has been brought to the position shown in Figure 4, whereupon spring 17 will move the keeper forwardly into engagement with the pin and hold it against movement as shown in Figures 1 to 4 inclusive.

Figure 7:
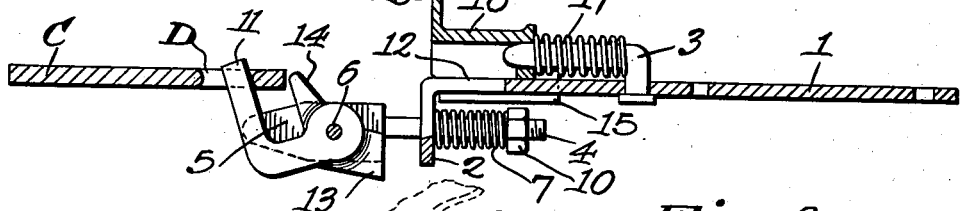
Figure 7 is a view similar to Figures 4 to 6, showing one of the positions of the parts while being automatically uncoupled.
Figure 8:
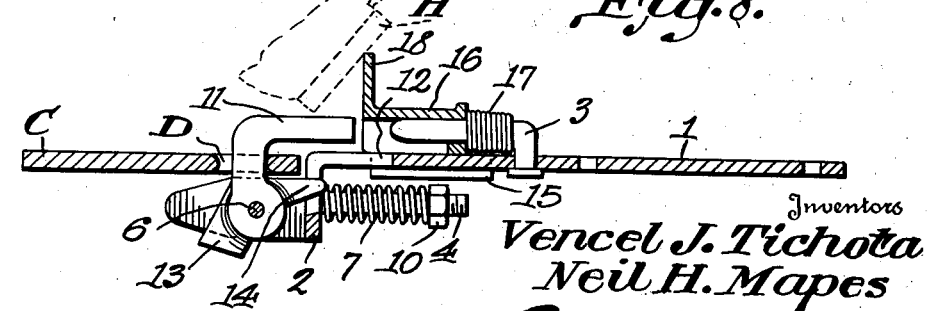
Figure 8 is a view similar to Figure 7 showing the parts being uncoupled by the operator.

Springs 7 are strong enough to withstand the resistance of the plow or other object being drawn under ordinary conditions. However, should the drawn structure be stopped by contact with a stump or the like, springs 7 would yield and pin 11 would pull heads 5 forwardly a sufficient distance to withdraw the pin from keeper 16. Thus the pin would be free to swing to the position shown in Figure 7 and release the plow or other pulled structure from the tongue C.

Whenever the operator desires to uncouple the parts, it is merely necessary for him to thrust with his heel H against plate 18, as shown in Figure 3. Thus the keeper will be pushed back off of pin 11 and the parts can be separated readily. When the heel is removed from plate 18, the spring 17, which, when released, has a tendency to move to the position shown in Figure 6, will be kicked back by the spring impelled keeper 16 and plate 18 so as to be thrown from the position shown in Figure 6 toward the position shown in Figure 5, thereby facilitating the uncoupling operation.

What is claimed is:

A coupling comprising a slotted element, a member for attachment to a structure to be pulled, a yieldingly restrained head slidably supported by said member, a keeper slidable on said member, a spring for exerting a thrust upon the keeper, a push plate extending from the keeper for engagement by the foot of an operator to shift the keeper against and to compress said spring, an angular coupling pin pivotally supported by the head, means movable with the pin and cooperating with said member for supporting the pin in an upwardly extended position within the slot in said element, and a tripping device movable with the pin and cooperating with said element to swing the pin through the slot and against the push plate to thrust said keeper out of normal position and release it for engagement with the pin to hold the pin against pivotal movement, said spring, while compressed, constituting means for actuating the keeper when freed from foot pressure and while released from the pin, to kick the pin toward full uncoupled position.

VENCEL J. TICHOTA.
NEIL H. MAPES.